US010982969B2

(12) United States Patent
Fowe

(10) Patent No.: US 10,982,969 B2
(45) Date of Patent: Apr. 20, 2021

(54) METHOD, APPARATUS, AND COMPUTER PROGRAM PRODUCT FOR LANE-LEVEL ROUTE GUIDANCE

(71) Applicant: HERE Global B.V., Eindhoven (NL)

(72) Inventor: James Fowe, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 188 days.

(21) Appl. No.: 16/167,808

(22) Filed: Oct. 23, 2018

(65) Prior Publication Data

US 2020/0124438 A1    Apr. 23, 2020

(51) Int. Cl.
  G01C 21/36   (2006.01)
  G08G 1/16   (2006.01)
  G01C 21/34   (2006.01)
  G01C 21/32   (2006.01)
  G06F 16/29   (2019.01)

(52) U.S. Cl.
  CPC ......... *G01C 21/3658* (2013.01); *G01C 21/32* (2013.01); *G01C 21/3461* (2013.01); *G01C 21/3469* (2013.01); *G01C 21/3492* (2013.01); *G06F 16/29* (2019.01); *G08G 1/167* (2013.01)

(58) Field of Classification Search
  None
  See application file for complete search history.

(56) References Cited

U.S. PATENT DOCUMENTS

| 6,385,539 | B1 | 5/2002 | Wilson et al. |
| 9,146,127 | B2 | 9/2015 | Bank et al. |
| 9,347,779 | B1 | 5/2016 | Lynch |

(Continued)

FOREIGN PATENT DOCUMENTS

| JP | 2006313519 A | 11/2006 |
| JP | 2008249401 A | 10/2008 |

(Continued)

OTHER PUBLICATIONS

Office Action for U.S. Appl. No. 16/167,823 dated Apr. 17, 2020.

(Continued)

*Primary Examiner* — Redhwan K Mawari
*Assistant Examiner* — Melanie J Patrick
(74) *Attorney, Agent, or Firm* — Alston & Bird LLP

(57) ABSTRACT

A method is provided for establishing determining lane-level route guidance, and more particularly, to establishing recommended lane-level guidance between an origin and a destination based on a safe, efficient, or popular path. Methods may include receiving a plurality of probe data points from a plurality of probe apparatuses, each probe apparatus traveling between a respective origin and destination pair; determining a lane-level maneuver pattern for each probe apparatus between the origin and the destination; providing for storage of the lane-level maneuver patterns for each probe apparatus in the memory; grouping together lane-level maneuver patterns for probe apparatuses having an origin and destination pair within a predefined similarity of origin and destination pairs of other apparatuses; and generating a lane-level maneuver pattern for each group based on at least one of a popularity, efficiency, or relatively safe lane-level maneuver pattern for the respective group.

20 Claims, 5 Drawing Sheets

(56) References Cited

U.S. PATENT DOCUMENTS

| | | |
|---|---|---|
| 9,672,734 B1 | 6/2017 | Ratnasingam |
| 9,709,406 B2 | 7/2017 | Bastiaensen et al. |
| 9,721,472 B2 | 8/2017 | Jain et al. |
| 9,799,218 B1 | 10/2017 | Gordon |
| 9,824,300 B2 | 11/2017 | Elwart et al. |
| 9,964,414 B2 | 5/2018 | Slavin et al. |
| 10,495,480 B1 | 12/2019 | Sivaraman |
| 2006/0220913 A1 | 10/2006 | Krautter et al. |
| 2007/0106470 A1 | 5/2007 | Nakayama et al. |
| 2008/0140303 A1 | 6/2008 | Hiruta et al. |
| 2009/0326814 A1 | 12/2009 | Harumoto et al. |
| 2010/0256852 A1* | 10/2010 | Mudalige .............. G08G 1/22 701/24 |
| 2011/0109475 A1 | 5/2011 | Basnayake |
| 2012/0095682 A1 | 4/2012 | Wilson |
| 2012/0116678 A1 | 5/2012 | Witmer |
| 2012/0173530 A1 | 7/2012 | Kurciska et al. |
| 2013/0275033 A1 | 10/2013 | Bastiaensen et al. |
| 2013/0282264 A1 | 10/2013 | Bastiaensen et al. |
| 2014/0278052 A1 | 9/2014 | Slavin et al. |
| 2015/0170514 A1 | 6/2015 | Stenneth |
| 2015/0262480 A1 | 9/2015 | Fowe et al. |
| 2015/0285656 A1 | 10/2015 | Verheyen et al. |
| 2015/0312327 A1 | 10/2015 | Fowe et al. |
| 2016/0035219 A1 | 2/2016 | Stenneth |
| 2016/0102986 A1 | 4/2016 | Ma et al. |
| 2016/0341561 A1 | 11/2016 | Woolley |
| 2017/0089717 A1 | 3/2017 | White et al. |
| 2018/0099676 A1 | 4/2018 | Goto et al. |
| 2018/0143643 A1 | 5/2018 | Fairfield et al. |
| 2018/0174443 A1 | 6/2018 | Fowe et al. |
| 2018/0182238 A1 | 6/2018 | Fowe et al. |
| 2018/0273032 A1 | 9/2018 | Yang et al. |
| 2019/0130742 A1 | 5/2019 | Tokunaga et al. |
| 2019/0310100 A1 | 10/2019 | Yang |
| 2020/0124439 A1 | 4/2020 | Fowe |

FOREIGN PATENT DOCUMENTS

| | | |
|---|---|---|
| JP | 2013171317 A | 9/2013 |
| WO | WO 2015/106913 A1 | 7/2015 |

OTHER PUBLICATIONS

EPO machine translation of JP 2008-249401 (original JP document published Oct. 16, 2008) (Year: 2008).

Deo, N. et al., *How Would Surround Vehicles Move A Unified Framework Maneuver Classification and motion Prediction*, Research Paper (Jan. 19, 2018), 12 pages.

Morris, B. et al., *Vector: Trajectory Analysis for Advanced Highway. Monitoring*, Research Paper, University of California (available online Apr. 3, 2015) 16 pages.

Wang, Q. et al., *Investigation of Discretionary Lane-Change Characteristics Using Next-Generation Simulation Data Sets*, Journal of Intelligent Transportation Systems, 18 (2014) 246-253.

You, F. et al., *Trajectory Planning and Tracking Control for Autonomous Lane Change Maneuver Based on the Cooperative Vehicle Infrastructure System*, Expert Systems With Applications 42 (2015) 5932-5946.

Hausdorff distance—Wikipedia [online][retrieved Nov. 26, 2018]. Retrieved from the Internet: https://en.wikipedia.org/wiki/Hausdorff-distance. Sep. 14, 2018) 4 pages.

Extended European Search Report for Application No. 19204942.7 dated Jun. 18, 2020, 9 pages.

Extended European Search Report for Application No. 19204921.1 dated Jun. 26, 2020, 10 pages.

Office Action for U.S. Appl. No. 16/167,823 dated Oct. 16, 2020.

Notice of Allowance for U.S. Appl. No. 16/167,823 dated Jan. 29, 2021.

Xuan et al., "Lane change maneuver detection from probe vehicle DGPS data", Proceedings of the IEEE ITSC 2006, 2006 IEEE Intelligent Transportation Systems Conference, Toronto, Canada, Sep. 17-20, 2006, Paper MC7.1, pages 624ff (Year: 2006).

\* cited by examiner

METHOD, APPARATUS, AND COMPUTER PROGRAM PRODUCT FOR LANE-LEVEL ROUTE GUIDANCE

TECHNOLOGICAL FIELD

An example embodiment of the present invention relates to determining lane-level route guidance, and more particularly, to establishing recommended lane-level guidance between an origin and a destination based on a safe and efficient path.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. Digital maps can further be enhanced with dynamic information, such as traffic information in real time along roads and through intersections.

Traffic data that is provided on digital maps is generally based on crowd-sourced data from mobile devices or probe data. The traffic data is typically reflective of a collective group of mobile devices traveling along a road segment, and may be useful in vehicle navigation applications in order for a user to avoid heavy traffic routes between an origin and a destination. However, the specificity with which route guidance is provided is generally limited.

BRIEF SUMMARY

A method, apparatus, and computer program product are provided in accordance with an example embodiment for determining lane-level route guidance, and more particularly, to establishing recommended lane-level guidance between an origin and a destination based on a safe, efficient, or popular path. Embodiments may provide a mapping system including a memory having map data stored therein and processing circuitry. The processing circuitry may be configured to: receive a plurality of probe data points, each probe data point received from a probe apparatus of a plurality of probe apparatuses, each probe apparatus traveling between a respective origin and a respective destination, each probe apparatus including one or more sensors and being onboard a respective vehicle, where each probe data point includes location information associated with the respective probe apparatus; determine a lane-level maneuver pattern for each probe apparatus between the origin and the destination; provide for storage of the lane-level maneuver patterns for each probe apparatus in the memory; group together lane-level maneuver patterns for probe apparatuses having an origin and destination pair within a predefined similarity of origin and destination pairs of other probe apparatuses; generate a lane-level maneuver pattern for each group based on at least one of a popularity, efficiency, or relatively safe lane-level maneuver pattern for the respective group; provide for route guidance to a vehicle based on the generated lane-level maneuver pattern.

According to some embodiments, the route guidance provided to a vehicle may include lane-level route guidance for an autonomous vehicle along a route between an origin and a destination. The processing circuitry configured to determine a lane-level maneuver pattern for each probe apparatus between the origin and the destination may include processing circuitry configured to: map match probe data from a respective probe apparatus to one or more road segments along a route between the origin and the destination; map match probe data from the respective probe apparatus to individual lanes of the one or more road segments along the route between the origin and the destination; and determine a lane-level maneuver pattern for the respective probe apparatus based on map matched lanes of the one or more road segments in a sequence from the origin to the destination. The processing circuitry configured to generate a lane-level maneuver pattern for each group based on at least one of a popularity, efficiency, or relatively safe lane-level maneuver pattern for the respective group may include processing circuitry configured to: apply a clustering algorithm to each group to obtain clusters of lane-level maneuver patterns within the respective group; select the cluster having a largest number of associated probe apparatuses; and generate the lane-level maneuver pattern for the respective group based on the lane-level maneuver pattern of the cluster having the largest number of associated probe apparatuses.

The processing circuitry configured to generate a lane-level maneuver pattern for each group based on at least one of a popularity, efficiency, or relatively safe lane-level maneuver pattern for the respective group may include processing circuitry configured to: apply a clustering algorithm to each group to obtain clusters of lane-level maneuver patterns within the respective group; select the cluster having a shortest time difference between the origin and the destination; and generate the lane-level maneuver pattern for the respective group based on the lane-level maneuver pattern of the cluster having the shortest time difference between the origin and the destination.

The processing circuitry of mapping systems of example embodiments configured to group together lane-level maneuver patterns for probe apparatuses having an origin and destination pair within a predefined similarity of origin and destination pairs of other probe apparatuses may include processing circuitry configured to: group together lane-level maneuver patterns for probe apparatuses having an origin and destination pair within a predefined similarity of origin and destination pairs of other probe apparatuses and having traveled between the origin and the destination within a predefined epoch, where the processing circuitry configured to generate a lane-level maneuver pattern for each group based on at least one of a popularity, efficiency, or relatively safe lane-level maneuver pattern for the respective group may further include processing circuitry configured to generate a lane-level maneuver pattern based, at least in part, on an epoch in which the route between the origin and the destination will be traveled. The processing circuitry may optionally be configured to provide driving speed, acceleration, and deceleration on a per-lane basis of the lane-level maneuver pattern based, at least in part, on the group of probe apparatuses associated with the lane-level maneuver pattern.

Embodiments described herein may provide an apparatus including at least one processor and at least one memory including computer program code. The at least one memory and computer program code configured to, with the processor, cause the apparatus to: receive a plurality of probe data points, each probe data point received from a probe apparatus of a plurality of probe apparatuses, each probe apparatus traveling between a respective origin and destination pair, each probe apparatus including one or more sensors and being onboard a respective vehicle, where each probe data point includes location information associated with the respective probe apparatus; determine a lane-level maneuver pattern for each probe apparatus between the origin and the destination; provide for storage of the lane-level maneuver patterns for each probe apparatus in the memory; group together lane-level maneuver patterns for probe apparatuses having an origin and destination pair within a predefined similarity of origin and destination pairs of other probe apparatuses; generate a lane-level maneuver pattern for each group based on at least one of a popularity, efficiency, or relatively safe lane-level maneuver pattern for the respective group; and provide for route guidance to a vehicle based on the generated lane-level maneuver pattern. The route guidance provided to a vehicle may include lane-level route guidance for an autonomous vehicle along a route between an origin and a destination.

According to some embodiments, causing the apparatus to determine a lane-level maneuver pattern for each probe apparatus between the origin and the destination may include causing the apparatus to: map match probe data from a respective probe apparatus to one or more road segments along a route between the origin and the destination; map match probe data from the respective probe apparatus to individual lanes of the one or more road segments along the route between the origin and the destination; and determine a lane-level maneuver pattern for the respective probe apparatus based on map matched lanes of the one or more road segments in a sequence from the origin to the destination. Causing the apparatus to generate a lane-level maneuver pattern for each group based on at least one of a popularity, efficiency, or relatively safe lane-level maneuver pattern for the respective group may include causing the apparatus to: apply a clustering algorithm to each group to obtain clusters of lane-level maneuver patterns within the respective group; select the cluster having a largest number of associated probe apparatuses; and generate the lane-level maneuver pattern for the respective group based on the lane-level maneuver pattern of the cluster having the largest number of associated probe apparatuses.

Causing the apparatus to group together lane-level maneuver patterns for probe apparatuses having an origin and destination pair within a predefined similarity of origin and destination pairs of other probe apparatuses may include causing the apparatus to: group together lane-level maneuver patterns for probe apparatuses having an origin and destination pair within a predefined similarity of origin and destination pairs of other probe apparatuses and having traveled between the origin and the destination within a predetermined epoch; where causing the apparatus to generate a lane-level maneuver pattern for each group based on at least one of a popularity, efficiency, or relatively safe lane-level maneuver pattern for the respective group may include causing the apparatus to generate a lane-level maneuver pattern based, at least in part, on an epoch in which the route between the origin and the destination will be traveled. The apparatus of example embodiments may be caused to provide driving speed, acceleration, and deceleration on a per-lane basis of the lane-level maneuver pattern based, at least in part, on the group of probe apparatuses associated with the lane-level maneuver pattern.

Embodiments described herein may provide a method including: receiving a plurality of probe data points, each probe data point received from a probe apparatus of a plurality of probe apparatuses, each probe apparatus traveling between a respective origin and destination pair, each probe apparatus including one or more sensors and being onboard a respective vehicle, where each probe data point includes location information associated with the respective probe apparatus; determining a lane-level maneuver pattern for each probe apparatus between the origin and the destination; providing for storage of the lane-level maneuver patterns for each probe apparatus in the memory; grouping together lane-level maneuver patterns for probe apparatuses having an origin and destination pair within a predefined similarity of origin and destination pairs of other apparatuses; generating a lane-level maneuver pattern for each group based on at least one of a popularity, efficiency, or relatively safe lane-level maneuver pattern for the respective group; and providing for route guidance to a vehicle based on the generated lane-level maneuver pattern. The route guidance may include lane-level route guidance for an autonomous vehicle along a route between an origin and a destination.

According to some methods, determining a lane-level maneuver pattern for each probe apparatus between the origin and the destination may include: map matching probe data from a respective probe apparatus to one or more road segments along a route between the origin and the destination; map matching probe data from the respective probe apparatus to individual lanes of the one or more road segments along the route between the origin and the destination; and determining a lane-level maneuver pattern for the respective probe apparatus based on map matched lanes of the one or more road segments in a sequence from the origin to the destination. Generating a lane-level maneuver pattern for each group based on at least one of a popularity, efficiency, or relatively safe lane-level maneuver pattern for the respective group may include: applying a clustering algorithm to each group to obtain clusters of lane-level maneuver patterns within the respective group; selecting the cluster having a largest number of associated probe apparatuses; and generating the lane-level maneuver pattern for the respective group based on the lane-level maneuver pattern of the cluster having the largest number of associated probe apparatuses.

Methods including generating a lane-level maneuver pattern for each group based on at least one of a popularity, efficiency, or relatively safe lane-level maneuver pattern for the respective group may include: applying a clustering algorithm to each group to obtain clusters of lane-level maneuver patterns within the respective group; selecting the cluster having a shortest time difference between the origin and the destination; and generating the lane-level maneuver pattern for the respective group based on the lane-level maneuver pattern of the cluster having the shortest time difference between the origin and the destination. Grouping together lane-level maneuver patterns for probe apparatuses having an origin and destination pair within a predefined similarity of origin and destination pairs of other probe apparatuses may include: grouping together lane-level maneuver patterns for probe apparatuses having an origin and destination pair within a predefined similarity of origin and destination pairs of other probe apparatuses and having traveled between the origin and the destination within a predetermined epoch; where generating a lane-level maneuver pattern for each group based on at least one of a popularity, efficiency, or relatively safe lane-level maneuver pattern for the respective group may further include generating a lane-level maneuver pattern based, at least in part, on an epoch in which the route between the origin and the destination will be traveled.

Embodiments described herein may provide an apparatus including: means for receiving a plurality of probe data points, each probe data point received from a probe apparatus of a plurality of probe apparatuses, each probe apparatus traveling between a respective origin and destination pair, each probe apparatus including one or more sensors and being onboard a respective vehicle, where each probe data point includes location information associated with the respective probe apparatus; means for determining a lane-level maneuver pattern for each probe apparatus between the origin and the destination; means for providing for storage of the lane-level maneuver patterns for each probe apparatus in the memory; means for grouping together lane-level maneuver patterns for probe apparatuses having an origin and destination pair within a predefined similarity of origin and destination pairs of other apparatuses; means for generating a lane-level maneuver pattern for each group based on at least one of a popularity, efficiency, or relatively safe lane-level maneuver pattern for the respective group; and means for providing for route guidance to a vehicle based on the generated lane-level maneuver pattern. The route guidance may include lane-level route guidance for an autonomous vehicle along a route between an origin and a destination.

According to some embodiments, the means for determining a lane-level maneuver pattern for each probe apparatus between the origin and the destination may include: means for map matching probe data from a respective probe apparatus to one or more road segments along a route between the origin and the destination; means for map matching probe data from the respective probe apparatus to individual lanes of the one or more road segments along the route between the origin and the destination; and means for determining a lane-level maneuver pattern for the respective probe apparatus based on map matched lanes of the one or more road segments in a sequence from the origin to the destination. The means for generating a lane-level maneuver pattern for each group based on at least one of a popularity, efficiency, or relatively safe lane-level maneuver pattern for the respective group may include: means for applying a clustering algorithm to each group to obtain clusters of lane-level maneuver patterns within the respective group; selecting the cluster having a largest number of associated probe apparatuses; and means for generating the lane-level maneuver pattern for the respective group based on the lane-level maneuver pattern of the cluster having the largest number of associated probe apparatuses.

An apparatus including means for generating a lane-level maneuver pattern for each group based on at least one of a popularity, efficiency, or relatively safe lane-level maneuver pattern for the respective group may include: means for applying a clustering algorithm to each group to obtain clusters of lane-level maneuver patterns within the respective group; means for selecting the cluster having a shortest time difference between the origin and the destination; and means for generating the lane-level maneuver pattern for the respective group based on the lane-level maneuver pattern of the cluster having the shortest time difference between the origin and the destination. The means for grouping together lane-level maneuver patterns for probe apparatuses having an origin and destination pair within a predefined similarity of origin and destination pairs of other probe apparatuses may include: means for grouping together lane-level maneuver patterns for probe apparatuses having an origin and destination pair within a predefined similarity of origin and destination pairs of other probe apparatuses and having traveled between the origin and the destination within a predetermined epoch; where the means for generating a lane-level maneuver pattern for each group based on at least one of a popularity, efficiency, or relatively safe lane-level maneuver pattern for the respective group may further include means for generating a lane-level maneuver pattern based, at least in part, on an epoch in which the route between the origin and the destination will be traveled.

BRIEF DESCRIPTION OF THE DRAWINGS

Figure 1:
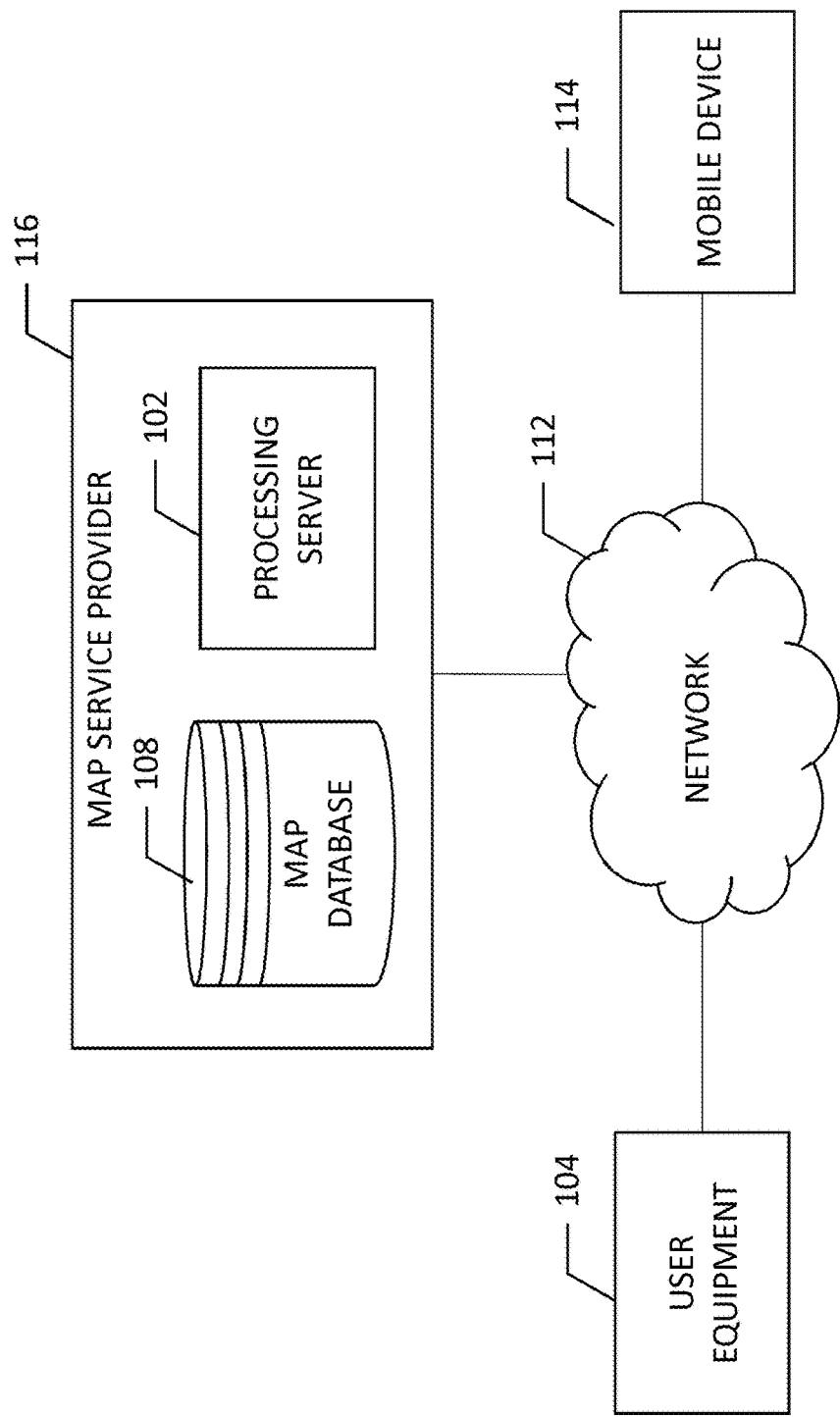
Figure 2:
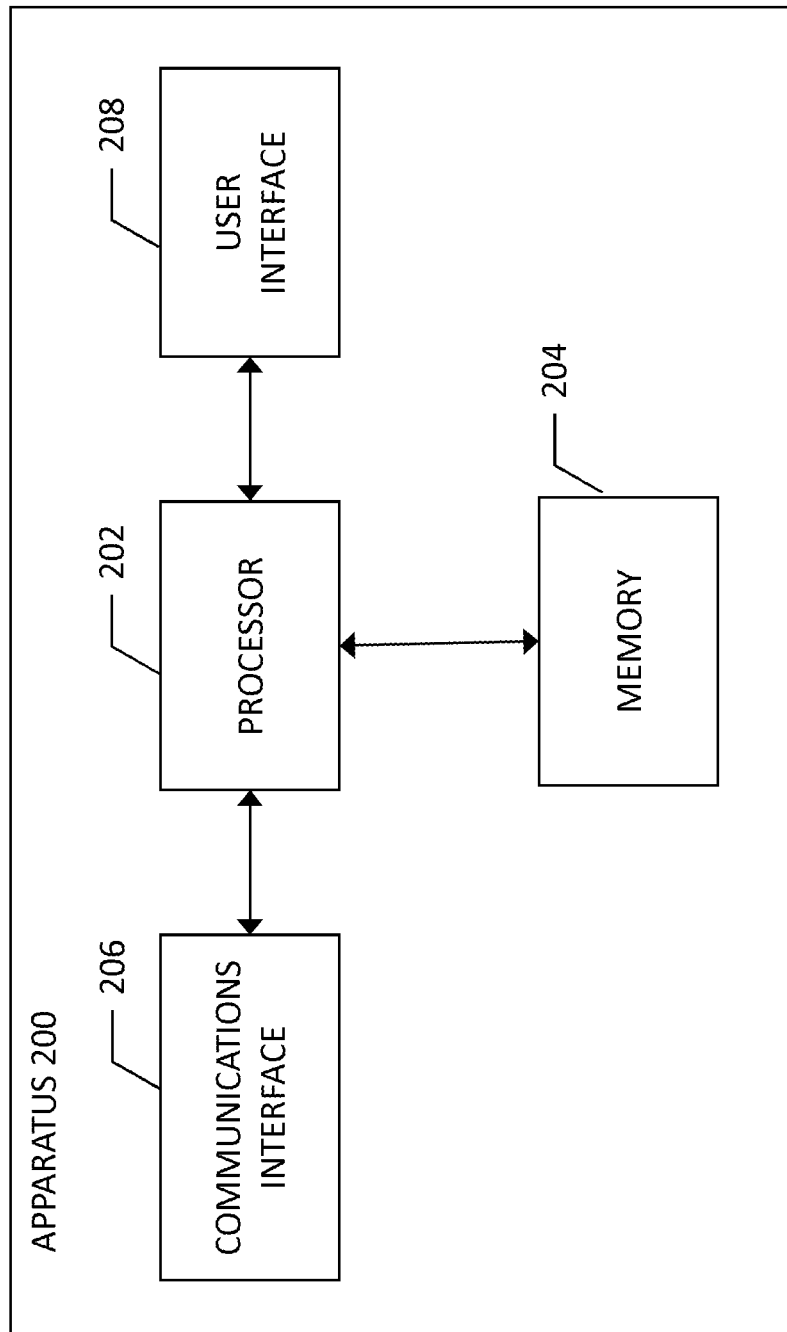
Figure 3:
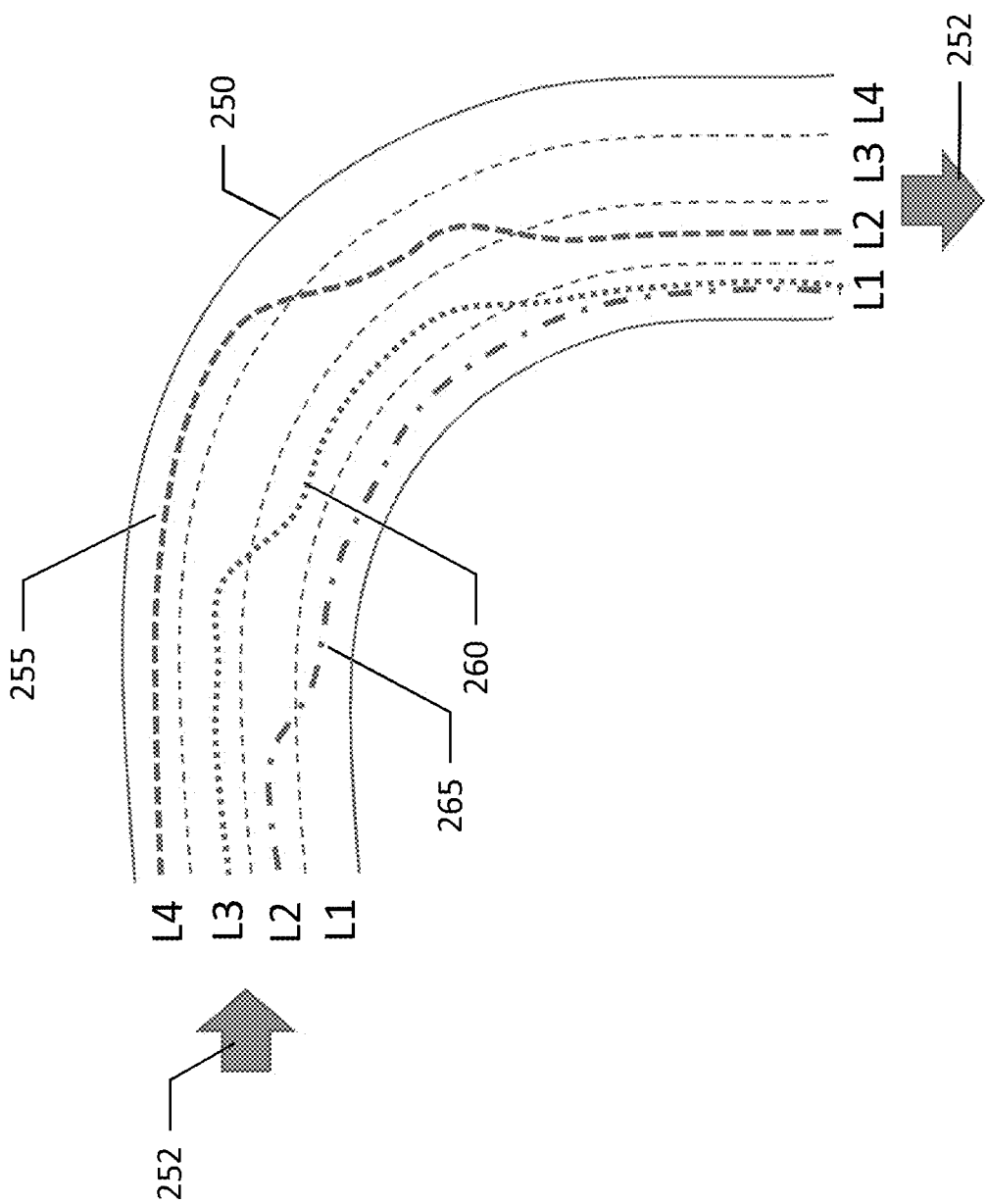
Figure 4:
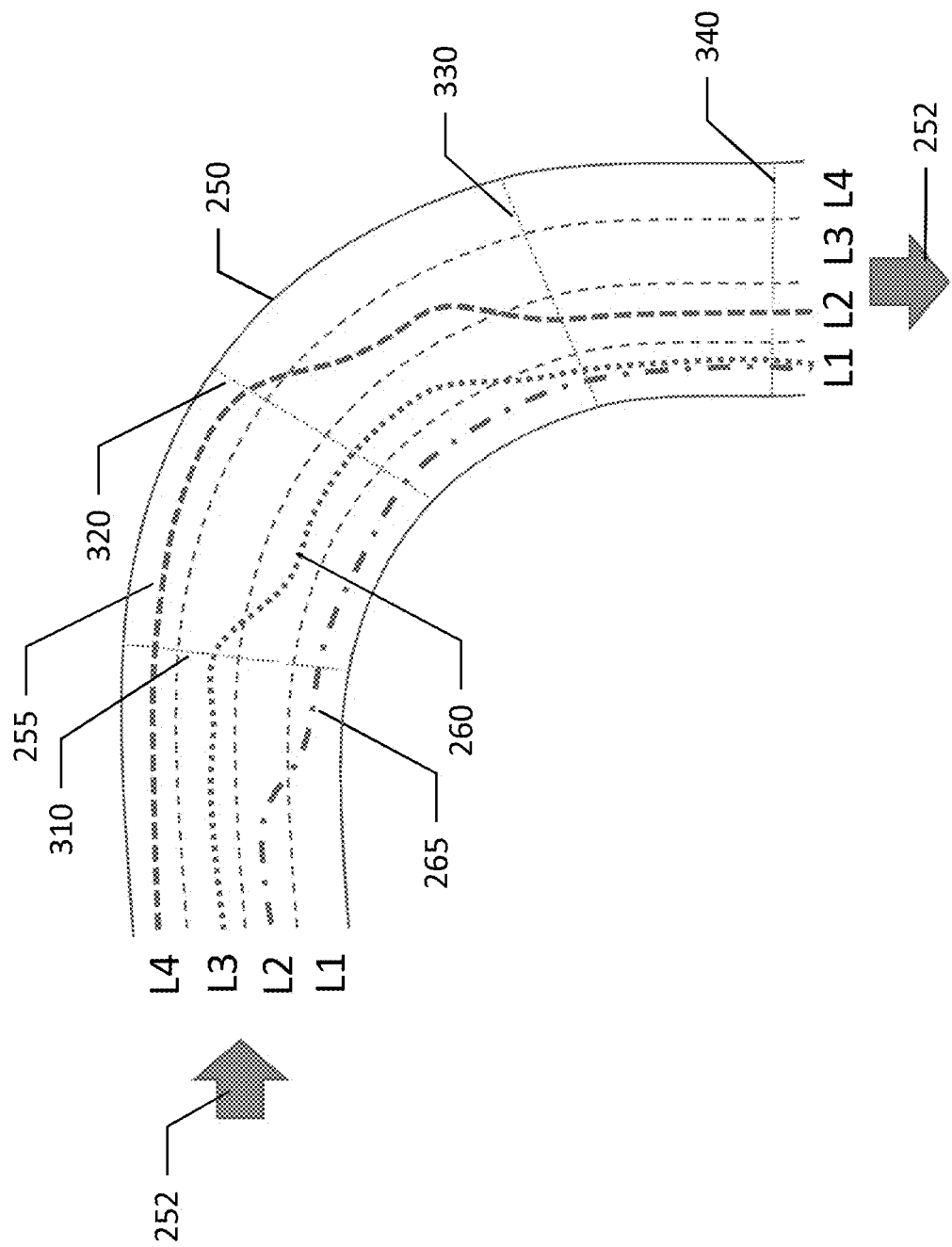
Figure 5:
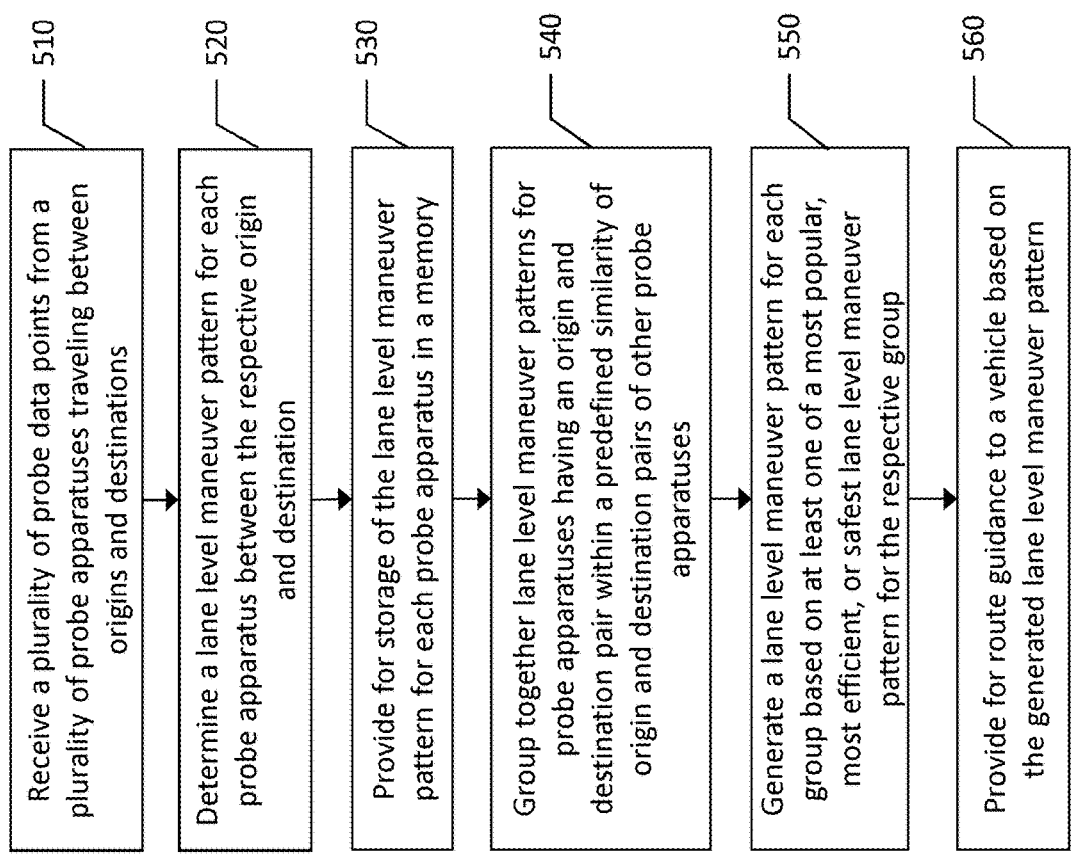

Having thus described example embodiments of the invention in general terms, reference will now be made to the accompanying drawings, which are not necessarily drawn to scale, and wherein:

FIG. 1 illustrates a communications diagram in accordance with an example embodiment;

FIG. 2 is a block diagram of an apparatus that may be specifically configured for establishing lane-level route guidance between an origin and a destination based on a safe and efficient lane-level path in accordance with an example embodiment described herein;

FIG. 3 illustrates a road segment including a plurality of lane-level paths along the road segment according to an example embodiment described herein;

FIG. 4 illustrates the road segment of FIG. 3 along sub segments of the road segment according to an example embodiment described herein; and FIG. 5 is a flowchart of a method for determining lane-level route guidance, and more particularly, to establishing recommended lane-level guidance between an origin and a destination based on a safe, efficient, or popular path according to an example embodiment described herein.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus, and computer program product are provided herein in accordance with an example embodiment for deriving lane-level guidance insight from historical data to obtain a pattern that can be used to recommend a safer path to drive/navigate a road segment. Embodiments may optionally factor in time of day and weather conditions when recommending a lane-level path from an origin to a destination. FIG. 1 illustrates a communication diagram of an example embodiment of a system for implementing example embodiments described herein. The illustrated embodiment of FIG. 1 includes a map services provider system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided.

For example, many mobile devices 114 may connect with the network 112. The map services provider 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map services provider 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) also known as a context associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Also, remote sensing, such as aerial or satellite photography, can be used to generate map geometries directly or through machine learning as described herein. Further, crowd-sourced data from vehicles traveling along the road links in the road network may provide information relating to their respective speed of travel, which may inform the map services provider with respect to traffic volumes and congestion and lane-level paths traveled by the respective vehicles. Such traffic congestion information and lane-level path information may be used during navigation or routing operations such that a user may be provided guidance as to which lane they should be driving along various road segments along the route from their origin to their destination.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. The navigation-related functions can correspond to vehicle navigation or other types of navigation. While example embodiments described herein generally relate to vehicular travel along roads, example embodiments may be implemented for bicycle travel along bike paths, boat travel along maritime navigational routes, aerial travel along highways in the sky, etc. The compilation to produce the end user databases can be performed by a party or entity separate from the map services provider. For example, a customer of the map services provider, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In one embodiment, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display.

An end user can use the user equipment 104 for navigation and map functions such as guidance and map display, for example, and for determination of one or more personalized routes or route segments based on one or more calculated and recorded routes, according to some example embodiments.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present invention for efficient and effective route generation from an origin to a destination. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Embodiments of the present invention provide a mechanism to derive lane-level guidance insight from historical data and to obtain a pattern that can be used to recommend safer ways to drive/navigate a road segment and may factor in the time of day and weather conditions for context. Embodiments may be beneficial to both human drivers (non-autonomous vehicles), semi-autonomous vehicles, and fully autonomous vehicles. Personal navigation devices and in-car navigation systems may include lane-level maps; however, they do not provide intelligent lane-level navigation information that can advise on a relatively safe lane for a vehicle to travel in along a road segment as the vehicle travels from an origin to a destination. Some navigation systems may provide a mechanism to avoid lanes due to accidents, hazards, or congestion; however, this is useful only during exceptional events. While some lane-level hazard warning may provide a useful tool, embodiments described herein provide a comprehensive approach to lane-level route guidance that improves safety and efficiency in a proactive manner rather than reacting to abnormal or exceptional events on a roadway.

In traveling along a road segment, many factors influence a decision regarding which lane a vehicle should travel in. These factors include an origin location, destination location, traffic speeds in the different lanes, exits and entrances to the roadway, and the like. Embodiments described herein provide smoothed lane-level guidance using historical data crowdsourced from other drivers in order to provide a safe and efficient path for a vehicle navigating through various road segments. Embodiments bring a new dimension into route guidance to learn from historical behaviors regarding how drivers have traversed the road segments in a safe manner and which lanes may be most popular for a lane navigation sequence in traversing an origin/destination route within a road network.

Embodiments described herein provide methods, apparatuses, and computer program products to create historical data that represents human drivers typical (or most popular) lane-level navigation in moving from an origin to a destination in a transportation/road network. While vehicles may share the same road segments, they do not necessarily share an origin or destination, even though they may be subject to similar lane-level traffic conditions. Each driver makes lane-level decisions based on their route and destination. Embodiments of the present disclosure create historical data that can advise on the best or more appropriate lanes for a vehicle to navigate on a road segment. To achieve this, data is obtained from drivers that have traversed similar origin/destination routes so that the lane choices taken may be focused on achieving a similar journey from the origin to the destination. Historical data is obtained that learns from how drivers have safely driven a road at a lane-level and that data may be used to guide new drivers traversing the same road segments. Further, embodiments may use data obtained from drivers to inform autonomous vehicles such that autonomous vehicles may be controlled according to the popular/safe/efficient routes selected by humans through machine learning of the lane-level routes.

FIG. 3 illustrates an example embodiment of crowd-sourced data relating to lane-level travel paths of vehicles as they traverse a road segment 250 having a traffic flow direction illustrated by arrows 252. This data may be used for generating lane-level maneuver pattern (LLMP) data which is the output of example embodiments described herein. As shown, there are three vehicle paths traversing the road segment 250. Those three paths are represented by lines 255, 260, and 265. As shown, the vehicle of path 255 begins on road segment 250 at lane four (L4) and changes lanes to lane L3 approximately in the midpoint of road segment 250, and changes lanes again shortly thereafter to lane L2. The vehicle of path 260 begins in lane L3, changes lanes to L2, and moves to lane L1 before exiting road segment 250. The vehicle of path 265 begins in lane L2 and changes lanes to lane L1 where the vehicle remains for the majority of the road segment 250. The paths of road segment 250 of FIG. 3 may be humanized lane-level driving (HLLD) which is used to establish a lane-level maneuver pattern that depicts the prevalent way human drivers navigate on the road segment at a lane-level when moving from an origin to a destination. According to the embodiment of FIG. 3, the paths gravitate toward the lanes on the inner side of the curve, lanes L1 and L2. This suggests that it is more desirable to be in lanes L1 or L2, such that a lane-level maneuver pattern may indicate that regardless of where a vehicle enters road segment 250 (among lanes L1 to L4), it is desirable to move to an inner lane L1 or L2 before exiting road segment 250, assuming the vehicles associated with paths 255, 260, and 265 have similar origins or destinations.

The lane-level maneuver pattern may be represented by a progression or sequence of lanes along the road segment. FIG. 4 illustrates the road segment 250 of FIG. 3 depicted with sub-segment divisions of the road segment. The road segment is illustrated as divided into four distinct road segments including the segment ending at line 310, the segment ending at line 320, the segment ending at line 330, and the segment ending at line 340. A lane-level maneuver pattern may be generated for a road segment or sequence of road segments including a plurality of sub-segments for improved granularity of the data and to avoid drastic lane change patterns across a segment, such as when a pattern may suggest a change of three lanes across a single segment, where it is desirable to provide such a pattern in incremental steps rather than an instruction at the transition from one road segment to the next to move three lanes from the current lane of travel.

According to the illustrated embodiment of FIG. 4, path 255 may have a lane-level maneuver pattern of L4→L4→L3→L2. The lane of the pattern may be identified in a number of ways. For example, the lane of a sub-segment may be identified as the lane in which the vehicle spent the majority of time or distance along the sub-segment. Optionally, the lane may be identified as the lane in which a vehicle was when they entered or exited a sub-segment. The lane-level maneuver pattern of path 260 may be represented as L3→L2→L2→L1, while the lane-level maneuver pattern of path 265 may be represented as L2→L1→L1→L1.

Routes are described herein between an origin and a destination for a vehicle or an origin and destination "pair". Vehicles may benefit from routes that do not identically match their origin and destination, but have a similar portion of their journey. For example, an origin and a destination may be different, but the routes may share a common segment of limited access highway. In such an embodiment, the routes may be a "similar" origin and destination for sharing a portion of the route that would be traveled in the same manner (e.g., same entrance or exit to a limited access highway) Similar origin/destination journeys reference journeys having routes that have a degree of overlap where their overlapping route portions would be traveled in the same manner such that lane selection along the overlapping route portions can be considered together. Origin and destination pairs may be grouped together based on a predefined similarity between the origin and destination pairs among a plurality of routes. This predefined similarity may include a degree of overlap of the routes. For example, exact origins and destinations between routes may not match; however, when the routes overlap by a certain percentage, such as 75 percent or more, the routes may be within a predefined similarity such that the origin and destination pairs may be considered close enough to be used in a single grouping of lane-level maneuver patterns. Further, origins and destinations may not be end points of a complete route, but may be end points of a portion of a route. For example, an origin may be an entrance ramp on a limited access highway, and a destination may be an exit ramp on the limited access highway. In this manner, all vehicles of the same type (e.g., passenger vehicles) that enter onto the limited access highway at the same point with the intent of exiting at the same point may be considered as the same origin and destination pair for that portion of their journey and should inform a lane-level maneuver pattern for such an origin and destination pair.

Historical data obtained according to example embodiments may be categorized according to a predefined category. These may include:

Humanized lane-level navigation: data in this category illustrates how most human drivers have been driving a road segment when on a similar origin/destination journey.

Autonomous vehicle lane-level navigation: data in this category indicates how previous autonomous vehicles have traversed such road segments at lane-level given a similar origin and/or destination.

General lane-level navigation: data in this category provides basic information of how most vehicles of any kind traverse road segments given a similar origin and/or destination.

Link or road segments: data in this category may be based, not on similar origins or destinations, but instead on each road segment, without regard to the origin or destination.

Embodiments described herein inspect a data archive of vehicles that have taken similar routes from an origin to a destination and then inspects the lane maneuver choices of those vehicles along the route so as to inform the most prevalent lane choice. After doing this for many routes, the data is analyzed and processed for a road segment using data from a plurality of routes that incorporate that road segment.

A navigation pattern may be established that is historically safe, historically optimal, or both, involving the most appropriate lane for a vehicle as it traverses the road segments of a route. Defined herein is a method for generating an optimal and safe navigation pattern at a lane-level. This may be achieved by obtaining historical trajectories of vehicle journeys from origins to destinations. This may be archived data from weeks, months, or even years. The amount of time in the historical data may be dependent upon the frequency with which an origin-destination journey is traveled, for example. Vehicles with similar origins and destinations or similar origin regions and similar destination regions may be grouped, and their lane-level maneuvers may be inspected. Vehicles may optionally be grouped by type, also. For example, large vehicles including trucks, recreational vehicles, and the like may use different lanes than smaller vehicles such as cars. As such, the lane-level maneuvers may be vehicle-type specific.

According to some embodiments, a link-level map matcher may be applied to probe data trajectories from vehicles in order to obtain probe path links in sequence. This provides a route from an origin to a destination for the respective vehicles. A subset of contiguous links on the routes that are common to vehicles are grouped per origin and destination of the subset, providing a broader database of origins and destinations that actual address locations of origins and destinations where specific vehicles start and end their respective routes. A lane-level map matcher may be run on each trajectory or vehicle path traveled in order to obtain the lane each vehicle traveled in along their route. This provides a path of the respective vehicles within the plurality of lanes along road segments of the routes having a plurality of lanes. A distance metric may be used that separates each trajectory, where the distance metric is a function of lane center distances from a centerline of the road segment and may be a measure from a road segment centerline to a vehicle path, thus identifying the lane of the vehicle. The distance metric may be used in a K-medoid clustering algorithm to obtain K clusters or most popular sequence of vehicle maneuver strategies along the road segments. The distance metric may be a summation of lane number difference over total links on the path of the vehicle. The medoid (center) of the clusters may represent the most popular lane maneuver as represented by the center of the cluster for each cluster.

Once the lane-level maneuvers for a group of vehicles having a similar origin and destination, and the lane-level maneuvers are clustered, the average time of travel for each medoid can be compared to indicate the fastest, most efficient lane-level maneuver strategy, while the cluster with the largest number of vehicles will represent the most popular approach. Filtering or comparing the data against historical incident data, particularly incident data with weather condition context, can help to obtain relatively safe lane-level maneuvers drivers take for these roads and at specific weather conditions. The driving speed, acceleration, and deceleration on a per-lane basis of the medoid route (or lane maneuver trajectory) may be used to recommend driving speeds for human drivers or speed limit for autonomous and semi-autonomous vehicles.

An example embodiment of a lane-level maneuver table depicting a lane-level maneuver pattern artifact is illustrated below including a plurality of columns of data. The first column, Segment-ID, refers to the identification of the road segment or link. The time-epoch column references a time or window of time in which the lane-level maneuver pattern is applicable, such as during a specific time of day (e.g., rush hour, night, day, etc.). A similar column may be present including a context, such as a weather condition which may define when the lane-level maneuver pattern is applicable. The upstream link and downstream link columns reference road segments that are used to enter (upstream) and exit (downstream) the road segment of the row in the table. The maneuver column defines which lane is recommended for the road segment. The maneuver can be a highly detailed data field including where a lane change is recommended, how quickly a lane change from one lane to another is recommended, or a progression of lane changes that may be recommended over the span of the road segment. The speed column may provide further information recommended for traversing the road segment. The speeds may also be defined by a distance along the road segment and a lane of the road segment.

maneuver strategy for a series of road segments or road sub-segments. However, probe data may also be collected using the same data fields of Table 1. Thus, Table 1 may represent the collected probe data for a route from among a plurality of probes having traveled the route and their resultant lane-level maneuver pattern. In such an embodiment, the raw data gathered in the table may be used to generate a table that includes the fastest, most efficient, and/or most popular lane-level maneuver strategy for a series of road segments of a route.

FIG. 5 illustrates a flowchart depicting a method according to example embodiments of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or

TABLE 1

Lane-level maneuver pattern artifact

| Segment-ID | Time-epoch | Upstream Link | Downstream Link | Maneuver | Speed (or TT) |
|---|---|---|---|---|---|
| Unique road segment ID or Linear or Strand or SCAR | timestamp | Routes that uses this link to enter the road Segment | Routes that exists the road segment with this Link ID | {LaneX:Distance1, LaneY:Distance2, . . . LaneZ:DistanceN} | {Distance1:Speed1, Distance2:Speed2, . . . DistanceN:SpeedN} |
| Unique road segment ID or Linear or Strand or SCAR | timestamp | Routes that uses this link to enter the road Segment | Routes that exists the road segment with this Link ID | {LaneX:Distance1, LaneY:Distance2, . . . LaneZ:DistanceN} | {Distance1:Speed1, Distance2:Speed2, . . . DistanceN:SpeedN} |

Lane changes may not be possible or safe at the position along a road segment that the lane change is recommended. As such, the maneuver data may have a window of time or distance along the road segment within which it is recommended to change lanes. This may provide some degree of variability in the lane change recommendations so a driver or autonomous vehicle does not need to attempt to change lanes as soon as it is recommended. This further enhances the safety of the present invention by avoiding sudden or unsafe lane changes.

According to the above-described lane-level maneuver pattern artifact of the table, all sub-segments of the segments in the artifact should have an equal total number of lanes. Hence, the map or road should be segmented such that a new segment is created when a total number of lanes change. This ensures consistency among the maneuvers of the artifact and conveys lane availability on a per segment basis. Table 1 above may represent a the fastest, most efficient lane-level maneuver strategy or most popular lane-level other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer sys- FIG. 5 illustrates a flowchart of a method according to an example embodiment of the present invention for establishing recommended lane-level guidance between an origin and a destination based on a safe, efficient, or popular path. At 510, a plurality of probe data points are received from a plurality of probe apparatuses traveling between origins and destinations. The probe data points are map-matched, as shown at 520, using a lane-level map matching process and system which correlates each probe data point with an individual lane along a road segment. A lane-level maneuver pattern is determined for each probe apparatus between the respective origin and destination as shown at 530. The lane-level maneuver patterns for each probe apparatus are stored in a memory at 540. Lane-level maneuver patterns are grouped together for probe apparatuses having an origin and destination pair within a predefined similarity of origin and destination pairs of other probe apparatuses at 550. A lane-level maneuver pattern for each group is generated at 560 based on at least one of a popularity, efficiency, or relatively safe lane-level maneuver pattern for the respective group. At 570, route guidance is provided to a vehicle based on the generated lane-level maneuver pattern.

In an example embodiment, an apparatus for performing the method of FIG. 5 above may comprise a processor (e.g., the processor 202) configured to perform some or each of the operations (510-570) described above. The processor may, for example, be configured to perform the operations (510-570) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-570 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A mapping system comprising:
a memory comprising map data; and
processing circuitry configured to:
receive a plurality of probe data points, each probe data point received from a probe apparatus of a plurality of probe apparatuses, each probe apparatus traveling between a respective origin and destination pair, each probe apparatus comprising one or more sensors and being onboard a respective vehicle, wherein each probe data point comprises location information associated with the respective probe apparatus;
determine a lane-level maneuver pattern including lane changes for each probe apparatus between the respective origin and destination pair; provide for storage of the lane-level maneuver patterns including lane changes for each probe apparatus in the memory; group together lane-level maneuver patterns including lane changes for probe apparatuses having an origin and destination pair within a predefined similarity of origin and destination pairs of other probe apparatuses to form groups; generate a lane-level maneuver pattern including lane changes for each group based on at least one of a popularity, efficiency, or safety of a lane-level maneuver pattern including lane changes for a respective group; and provide for route guidance to a vehicle based on the generated lane-level maneuver pattern including lane changes.

2. The mapping system of claim 1, wherein the route guidance provided to a vehicle comprises lane-level route guidance for an autonomous vehicle along a route between an origin and a destination.

3. The mapping system of claim 1, wherein the processing circuitry configured to determine the lane-level maneuver pattern including lane changes for each probe apparatus between the origin and destination pair comprises processing circuitry configured to: map match probe data from a respective probe apparatus to one or more road segments along a route between the origin and destination pair; map match probe data from the respective probe apparatus to individual lanes of the one or more road segments along the route between the origin and destination pair; and determine a lane-level maneuver pattern including lane changes for the respective probe apparatus based on map matched lanes of the one or more road segments in a sequence between the origin and destination pair.

4. The mapping system of claim 1, wherein the processing circuitry configured to generate the lane-level maneuver pattern including lane changes for each group based on at least one of a popularity, efficiency, or safety of the lane-level maneuver pattern including lane changes for the respective group comprises processing circuitry configured to: apply a clustering algorithm to each group to obtain clusters of lane-level maneuver patterns including lane changes within the respective group; select a cluster having a largest number of associated probe apparatuses; and generate the lane-level maneuver pattern including lane changes for the respective group based on the lane-level maneuver pattern including lane changes of the cluster having the largest number of associated probe apparatuses.

5. The mapping system of claim 1, wherein the processing circuitry configured to generate the lane-level maneuver pattern including lane changes for each group based on at least one of a popularity, efficiency, or safety of the lane-level maneuver pattern including lane changes for the respective group comprises processing circuitry configured to: apply a clustering algorithm to each group to obtain clusters of lane-level maneuver patterns including lane changes within the respective group; select a cluster having a shortest time difference between the origin and destination pair; and generate the lane-level maneuver pattern including lane changes for the respective group based on the lane-level maneuver pattern including lane changes of the cluster having the shortest time difference between the origin and destination pair.

6. The mapping system of claim 1, wherein the processing circuitry configured to group together the lane-level maneuver patterns including lane changes for probe apparatuses having the origin and destination pair within the predefined similarity of origin and destination pairs of other probe apparatuses further comprises processing circuitry configured to: group together the lane-level maneuver patterns including lane changes for probe apparatuses having the origin and destination pair within the predefined similarity of origin and destination pairs of other probe apparatuses and having traveled between the origin and destination pair within a predetermined epoch; wherein the processing circuitry configured to generate the lane-level maneuver pattern including lane changes for each group based on at least one of a popularity, efficiency, or safety of the lane-level maneuver pattern including lane changes for the respective group further comprises processing circuitry to generate the lane-level maneuver pattern including lane changes based, at least in part, on an epoch in which a route between the origin and destination pair will be traveled.

7. The mapping system of claim 1, wherein the processing circuitry is further configured to:
provide driving speed, acceleration, and deceleration on a per-lane basis of the lane-level maneuver pattern including lane changes based, at least in part, on the respective group of probe apparatuses associated with the lane-level maneuver pattern including lane changes.

8. An apparatus comprising at least one processor and at least one memory including computer program code, the at least one memory and computer program code configured to, with the processor, cause the apparatus to at least:
receive a plurality of probe data points, each probe data point received from a probe apparatus of a plurality of probe apparatuses, each probe apparatus traveling between a respective origin and destination pair, each probe apparatus comprising one or more sensors and being onboard a respective vehicle, wherein each probe data point comprises location information associated with the respective probe apparatus;
determine a lane-level maneuver pattern including lane changes for each probe apparatus between the respective origin and destination pair; provide for storage of the lane-level maneuver patterns including lane changes for each probe apparatus in the memory; group together lane-level maneuver patterns including lane changes for probe apparatuses having an origin and destination pair within a predefined similarity of origin and destination pairs of other probe apparatuses to form groups; generate a lane-level maneuver pattern including lane changes for each group based on at least one of a popularity, efficiency, or safety of a lane-level maneuver pattern including lane changes for a respective group; and provide for route guidance to a vehicle based on the generated lane-level maneuver pattern including lane changes.

9. The apparatus of claim 8, wherein the route guidance provided to a vehicle comprises lane-level route guidance for an autonomous vehicle along a route between an origin and a destination.

10. The apparatus of claim 8, wherein causing the apparatus to determine the lane-level maneuver pattern including lane changes for each probe apparatus between the origin and destination pair comprises causing the apparatus to: map match probe data from a respective probe apparatus to one or more road segments along a route between the origin and destination pair; map match probe data from the respective probe apparatus to individual lanes of the one or more road segments along the route between the origin and destination pair; and determine a lane-level maneuver pattern including lane changes for the respective probe apparatus based on map matched lanes of the one or more road segments in a sequence between the origin and to the destination pair.

11. The apparatus of claim 8, wherein causing the apparatus to generate the lane-level maneuver pattern including lane changes for each group based on at least one of a popularity, efficiency, or safety of the lane-level maneuver pattern including lane changes for the respective group comprises causing the apparatus to: apply a clustering algorithm to each group to obtain clusters of lane-level maneuver patterns including lane changes within the respective group; select a cluster having a largest number of associated probe apparatuses; and generate the lane-level maneuver pattern including lane changes for the respective group based on the lane-level maneuver pattern including lane changes of the cluster having the largest number of associated probe apparatuses.

12. The apparatus of claim 8, wherein causing the apparatus to generate the lane-level maneuver pattern including lane changes for each group based on at least one of a popularity, efficiency, or safety of the lane-level maneuver pattern including lane changes for the respective group comprises causing the apparatus to: apply a clustering algorithm to each group to obtain clusters of lane-level maneuver patterns including lane changes within the respective group; select a cluster having a shortest time difference between the origin and destination pair; and generate the lane-level maneuver pattern including lane changes for the respective group based on the lane-level maneuver pattern including lane changes of the cluster having the shortest time difference between the origin and destination pair.

13. The apparatus of claim 8, wherein causing the apparatus to group together the lane-level maneuver patterns including lane changes for probe apparatuses having the origin and destination pair within the predefined similarity of origin and destination pairs of other probe apparatuses further comprises causing the apparatus to: group together lane-level maneuver patterns including lane changes for probe apparatuses having the origin and destination pair within the predefined similarity of origin and destination pairs of other probe apparatuses and having traveled between the origin and destination pair within a predetermined epoch; wherein causing the apparatus to generate the lane-level maneuver pattern including lane changes for each group based on at least one of a popularity, efficiency, or safety of the lane-level maneuver pattern including lane changes for the respective group further comprises causing the apparatus to generate the lane-level maneuver pattern including lane changes based, at least in part, on an epoch in which a route between the origin and destination pair will be traveled.

14. The apparatus of claim 8, wherein the apparatus is further caused to:
provide driving speed, acceleration, and deceleration on a per-lane basis of the lane-level maneuver pattern including lane changes based, at least in part, on the respective group of probe apparatuses associated with the lane-level maneuver pattern including lane changes.

15. A method comprising:
receiving a plurality of probe data points, each probe data point received from a probe apparatus of a plurality of probe apparatuses, each probe apparatus traveling between a respective origin and destination pair, each probe apparatus comprising one or more sensors and being onboard a respective vehicle, wherein each probe data point comprises location information associated with the respective probe apparatus;

determining a lane-level maneuver pattern including lane changes for each probe apparatus between the respective origin and destination pair; providing for storage of the lane-level maneuver patterns including lane changes for each probe apparatus in a memory; grouping together lane-level maneuver patterns including lane changes for probe apparatuses having an origin and destination pair within a predefined similarity of origin and destination pairs of other probe apparatuses to form groups; generating a lane-level maneuver pattern including lane changes for each group based on at least one of a popularity, efficiency, or safety of a lane-level maneuver pattern including lane changes for a respective group; and providing for route guidance to a vehicle based on the generated lane-level maneuver pattern including lane changes.

16. The method of claim 15, wherein the route guidance provided to a vehicle comprises lane-level route guidance for an autonomous vehicle along a route between an origin and a destination.

17. The method of claim 15, wherein determining the lane-level maneuver pattern including lane changes for each probe apparatus between the origin and destination pair comprises: map matching probe data from a respective probe apparatus to one or more road segments along a route between the origin and destination pair; map matching probe data from the respective probe apparatus to individual lanes of the one or more road segments along the route between the origin and destination pair; and determining a lane-level maneuver pattern including lane changes for the respective probe apparatus based on map matched lanes of the one or more road segments in a sequence between the origin and to the destination pair.

18. The method of claim 15, wherein generating the lane-level maneuver pattern including lane changes for each group based on at least one of a popularity, efficiency, or safety of the lane-level maneuver pattern including lane changes for the respective group comprises: applying a clustering algorithm to each group to obtain clusters of lane-level maneuver patterns including lane changes within the respective group; selecting a cluster having a largest number of associated probe apparatuses; and generating the lane-level maneuver pattern including lane changes for the respective group based on the lane-level maneuver pattern including lane changes of the cluster having the largest number of associated probe apparatuses.

19. The method of claim 15, wherein generating the lane-level maneuver pattern maneuver pattern including lane changes for each group based on at least one of a popularity, efficiency, or safety of the lane-level maneuver pattern including lane changes for the respective group comprises: applying a clustering algorithm to each group to obtain clusters of lane-level maneuver patterns including lane changes within the respective group; selecting a cluster having a shortest time difference between the origin and destination pair; and generating the lane-level maneuver pattern including lane changes for the respective group based on the lane-level maneuver pattern including lane changes of the cluster having the shortest time difference between the origin and destination pair.

20. The method of claim 15, wherein generating the lane-level maneuver pattern maneuver patterns including lane changes for probe apparatuses having the origin and destination pair within the predefined similarity of origin and destination pairs of other probe apparatuses further comprises: grouping together lane-level maneuver patterns including lane changes for probe apparatuses having the origin and destination pair within the predefined similarity of origin and destination pairs of other probe apparatuses and having traveled between the origin and destination pair within a predetermined epoch; wherein generating a lane-level maneuver pattern including lane changes for each group based on at least one of a popularity, efficiency, or safety of the lane-level maneuver pattern including lane changes for the respective group further comprises generating the lane-level maneuver pattern including lane changes based, at least in part, on an epoch in which a route between the origin and destination pair will be traveled.

* * * * *

UNITED STATES PATENT AND TRADEMARK OFFICE
CERTIFICATE OF CORRECTION

PATENT NO. : 10,982,969 B2
APPLICATION NO. : 16/167808
DATED : April 20, 2021
INVENTOR(S) : Fowe It is certified that error appears in the above-identified patent and that said Letters Patent is hereby corrected as shown below:

In the Claims

Column 22,
Line 11, "lane-level maneuver pattern maneuver pattern including" should read --lane-level maneuver pattern including--;
Line 25, "lane-level maneuver pattern maneuver patterns including" should read --lane-level maneuver patterns including--.

Signed and Sealed this
Nineteenth Day of April, 2022

Katherine Kelly Vidal
*Director of the United States Patent and Trademark Office*